Oct. 14, 1958     A. G. MENTES     2,856,232
DUMP TRUCK

Filed Nov. 30, 1954     4 Sheets-Sheet 1

INVENTOR.
ALEXANDER G. MENTES
BY
Clark & Ott
ATTORNEYS

Oct. 14, 1958 — A. G. MENTES — 2,856,232
DUMP TRUCK
Filed Nov. 30, 1954 — 4 Sheets-Sheet 2
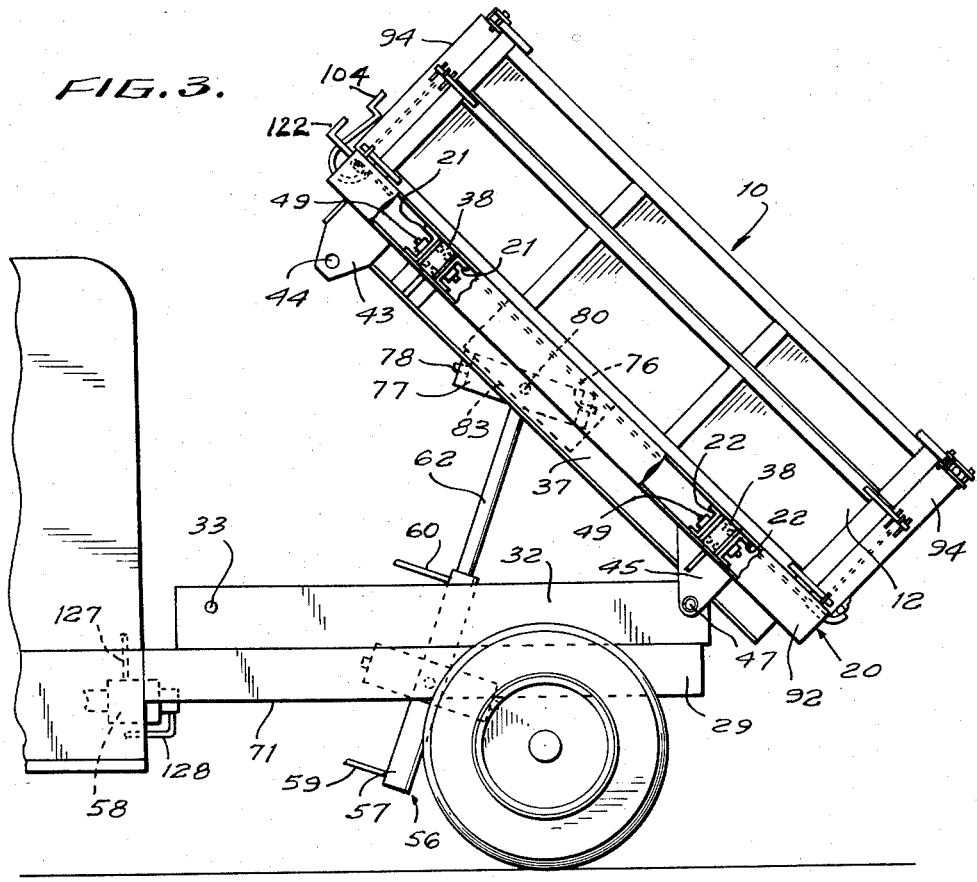
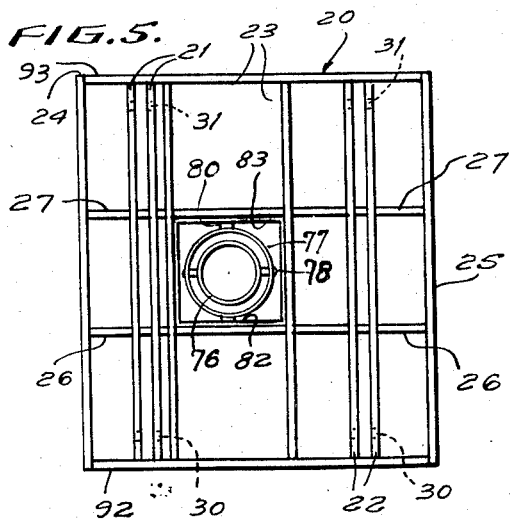
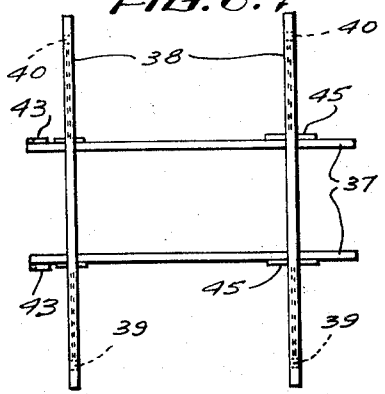
INVENTOR.
ALEXANDER G. MENTES
BY
Clark & Ott
ATTORNEYS Oct. 14, 1958   A. G. MENTES   2,856,232
DUMP TRUCK Filed Nov. 30, 1954   4 Sheets-Sheet 3

INVENTOR.
ALEXANDER G. MENTES
BY
Clark & Ott
ATTORNEYS

Oct. 14, 1958     A. G. MENTES     2,856,232
DUMP TRUCK
Filed Nov. 30, 1954     4 Sheets-Sheet 4
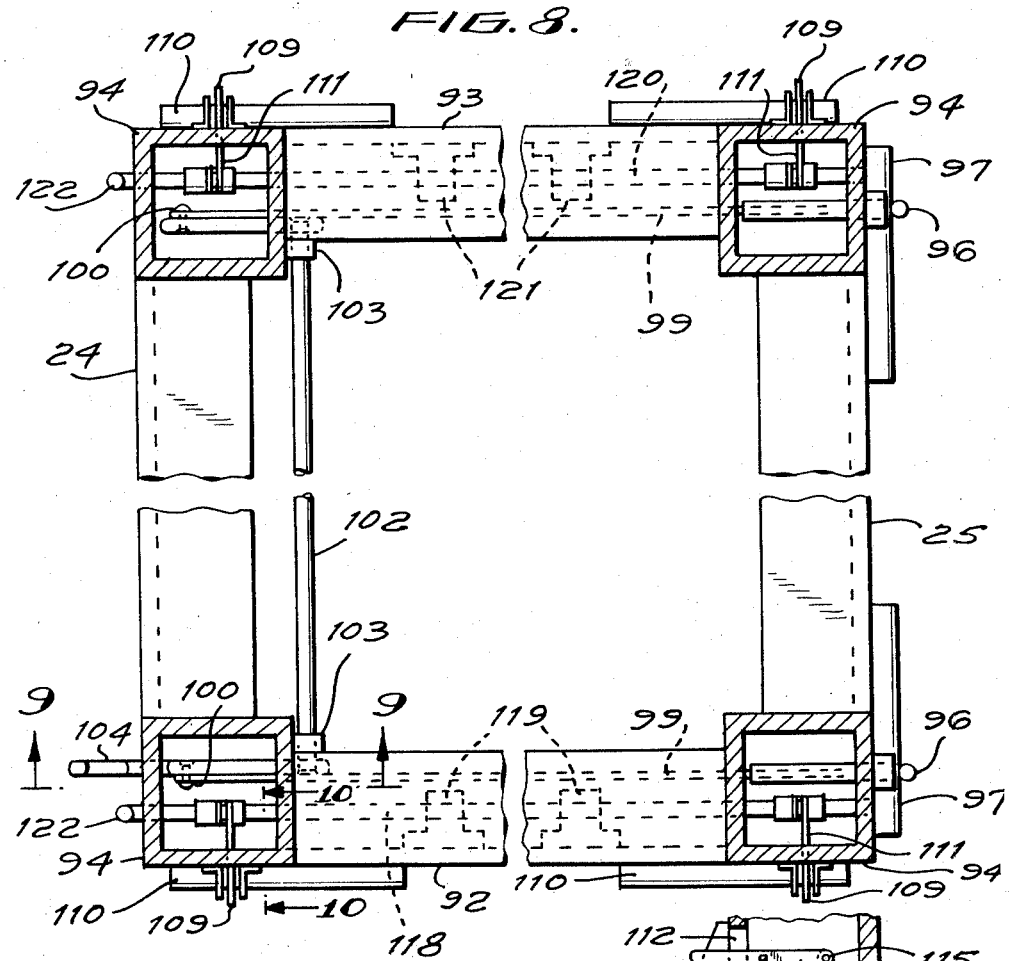
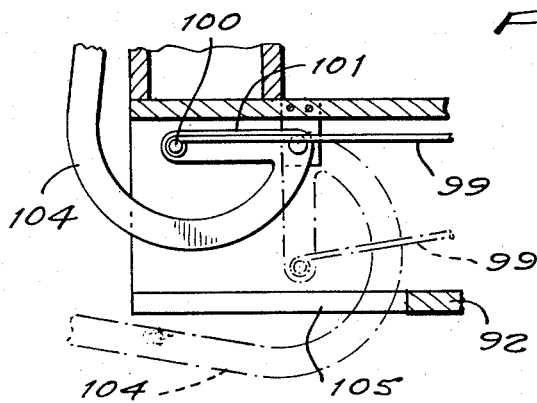
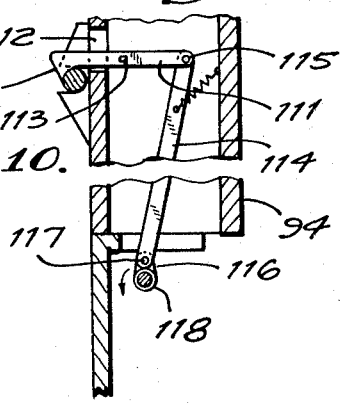
INVENTOR.
ALEXANDER G. MENTES
BY
Clark&Clark
ATTORNEYS United States Patent Office 2,856,232
Patented Oct. 14, 1958

2,856,232
DUMP TRUCK

Alexander G. Mentes, Hasbrouck Heights, N. J., assignor to Mentes-Williams Co., Inc., Hasbrouck Heights, N. J., a corporation of New Jersey Application November 30, 1954, Serial No. 472,006

1 Claim. (Cl. 298—22)

This invention relates to a dump truck which is constructed and arranged to dump material from the rear of the truck body or from either side thereof.

An object of the invention is to provide a dump truck in which the truck body is pivoted at each side on longitudinal axes respectively and is also pivoted on a transverse axis at the rear for swinging movement of the truck body on said axes respectively for optionally dumping material from either side of the truck body or from the rear.

Another object of the invention is the provision of pivotal means on which the truck body is elevated for dumping which also constitutes locking means for retaining the truck body in normal position on the truck chassis unless released for dumping.

Another object of the invention is to provide an improved frame construction which supports the truck body on the chassis and which is pivoted for swinging movement to disposed the truck body in inclined relation toward either side or toward the rear.

A further object of the invention is to provide hydraulic means which is pivotally connected with the truck body and with the truck chassis on transverse and longitudinal axes for raising the truck body into inclined relation toward either side or toward the rear and for lowering the truck body to normal relation.

Still another object of the invention resides in a dual hydraulic means which is connected together in parallel relation to provide a single raising and supporting thrust.

With the foregoing and other objects in view, reference is now made to the following specification and accompanying drawings in which, Fig. 1 is a rear view of a truck constructed in accordance with the invention.

Fig. 3 is a similar view showing the truck body elevated for dumping from the rear thereof.

Fig. 5 is a top plan view of the truck body frame with the truck body removed.

Fig. 6 is a top plan view of a frame intermediate the truck body frame and the chassis supported frame members and to which both the truck body frame and the chassis supported frame members are pivoted.

Fig. 8 is an enlarged horizontal sectional view through the truck body with parts broken away and showing the corner posts in section and the supporting frame members with the bed of the truck removed.

Fig. 9 is a fragmentary vertical sectional view taken approximately on line 9—9 of Fig. 8.

Fig. 10 is a similar view taken approximately on line 10—10 of Fig. 8.

Figure 1:
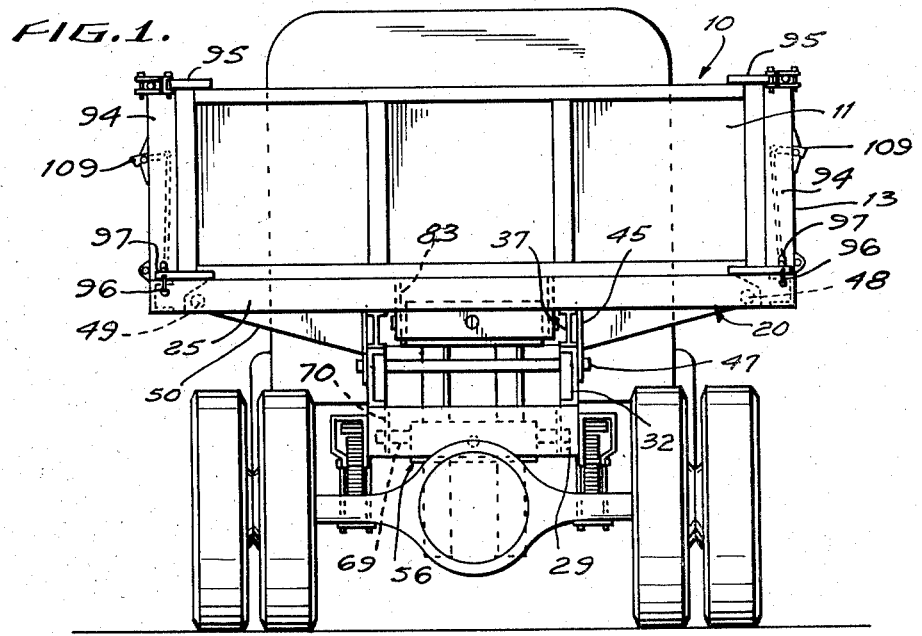
Figure 2:
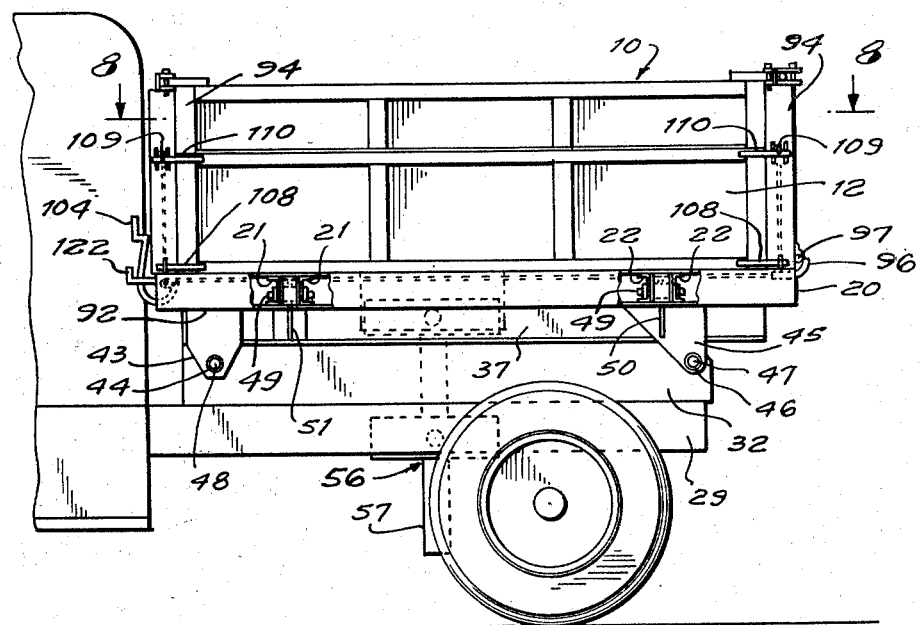
Fig. 2 is a side view thereof with the engine and cab portion of the truck broken away.
Figure 4:
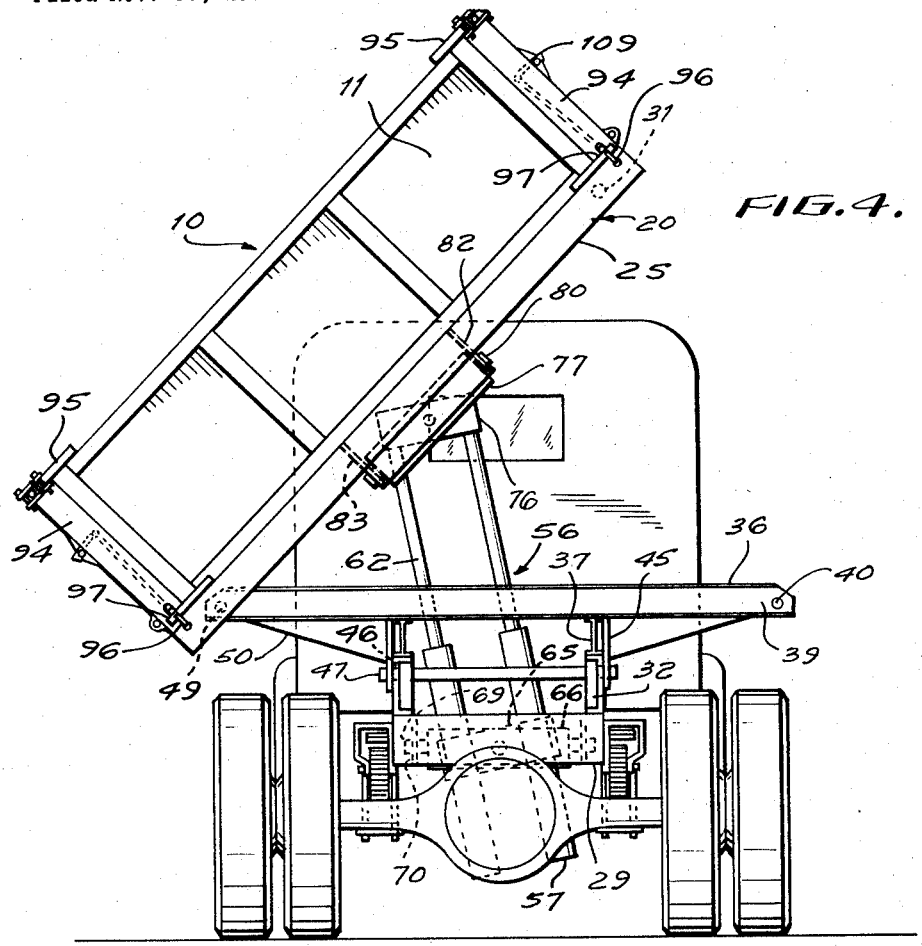
Fig. 4 is an end view of the truck showing the truck body elevated for dumping from one side thereof.
Figures 7, 11:
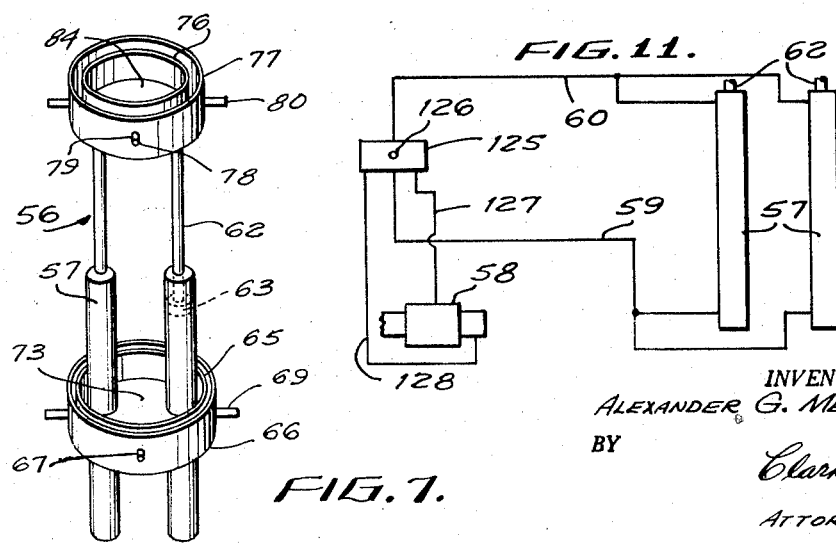
Fig. 7 is a perspective view of the hydraulic means for raising and lowering the truck body.
Fig. 11 is a schematic view showing the arrangement of an hydraulic pump and a manual control valve for supplying hydraulic fluid to the cylinders.

Referring to the drawings, the truck includes a truck body 10 having a rear gate 11 and side gates 12 and 13. The gates may be pivoted in any desired manner, and as illustrated, the rear gate 11 is pivoted at the top for outward swinging movement to permit of dumping through the rear of the truck while the side gates 12 and 13 are pivoted at the bottom to permit of downward swinging movement of the gates into coplanar relation with the body of the truck for dumping from either side.

The truck body 10 includes a frame indicated generally by the reference character 20 to which the truck bed is affixed and which includes two transversely extending parallel channel members 21 arranged in spaced back to back relation and located adjacent the forward portion of the truck body. Two similar channel members 22 are also provided which are arranged in spaced back to back relation and located adjacent the rear of the truck body. Intermediate the channel members 21 and 22 are two transversely extending channel members 23 which are arranged in spaced back to back relation and are arranged with the transverse center between said members disposed forwardly of the transverse center of the truck. The frame also includes end channel members 24 and 25 which underlie the front and rear ends of the truck. Longitudinally extending channel sections 26 and 27 connect the several transversely extending channel members together in frame formation. The channel members 21 and 22 and the channel members 23 extend substantially the full width of the truck body and the channel members 21 and 22 are provided with aligned openings 30 adjacent one side of the frame and with aligned openings 31 adjacent the opposite side thereof.

Supported on and affixed to the chassis frame 29 are longitudinally extending transversely spaced channel members 32 which have aligned openings 33 adjacent their forward ends and aligned openings 34 adjacent their rear ends. Arranged intermediate the frame 20 and the channel members 32 is an intermediate frame 36 which consists of two I-beams 37 extending longitudinally of the chassis and disposed in alignment with the channel members 32 on which they are adapted to seat. Secured to the top flanges of the I-beams 37 are transversely extending I-beams 38 which are spaced apart a distance to interfit between the channel members 21 and the channel members 22 respectively. The I-beams 38 are provided with aligned openings 39 adjacent one side of the frame and with aligned openings 40 adjacent the other side thereof and which align with the openings 30 and 31 in the channel members 21 and 22 when the frame 36 is in interfitted relation with the frame 20.

Affixed to the forward ends of the I-beams 37 are depending side plates 43 which engage outside the channel members 32 and are provided with openings 44 which are aligned with the openings 33 in said channel members when the intermediate frame 20 is seated on the channel members 32. Depending hinge plates 45 are also affixed to the I-beams 37 adjacent their outer ends, which plates have their lower ends disposed outside of the channel members 32 and have openings 46 for receiving a hinge pin 47 extending transversely through the side plates and through the openings 34 in the channel members 32 for hingedly connecting the truck body with the truck chassis for dumping through the tail gate.

In order to retain the truck body in downward relation on the channel members 32 a sliding pin 48 is provided for each of the side plates 43 which removably fit the openings 44 in said side plates and the openings 33 in the channel members 32. Hinge pins 49 are also provided at each side of the truck, one such pin extending through the openings 30 at each end of the channel members 21 of the frame 20 and through the openings 39 in the ends of the forward I-beams 38 of the intermediate frame 36. Another such hinge pin 49 is arranged in the openings 31 at each end of the channel members 22 of the frame 20 and in the openings 39 in the ends of the rear I-beams 38 of the intermediate frame 36. Thus, when the hinge pins 48 and 49 are in position, the truck body is secured in lowered position against tilting either to the right or left or to the rear. When, however, the pins 48 are removed the truck body together with the frame 20 and the intermediate frame 36 may be elevated to inclined relation on the hinge pin 47 for dumping through the rear of the truck and when the hinge pins 49 on the left side of the truck body are removed the truck body may be elevated for dumping through the right side of the truck and when the pins on the right side of the truck are removed the truck body may be elevated for dumping through the left side thereof. When the truck body is lowered to the normal position, the pins are again inserted in position in the said openings. The hinge plates 45 are rigidly affixed to the I-beams 37 and 38 of the intermediate frame 36 by means of vertical gusset plates 50 and at the forward end of said frame vertical gusset plates 51 are rigidly affixed to the foremost I-beam 37 and to the I-beam 38.

The truck body 10 is elevated for dumping either to the right or left or to the rear by means of an hydraulic mechanism indicated generally by the refernce character 56 which includes two hydraulic cylinders 57 arranged one on each side of the drive shaft of the truck and which are spaced apart to provide sufficient clearance so as to avoid interference with the drive shaft. An hydraulic pump 58 is provided which is driven by the motor of the truck for forcing hydraulic fluid into the cylinders through the conduits 59 and 60 for raising and lowering the piston rods 62 which have piston heads 63 mounted within the cylinders.

The cylinders 57 are mounted on the chassis frame 29 for swivel turning movement by means of inner and outer concentric rings 65 and 66 which are pivoted for turning movement on diametrically disposed pins 67 secured to the inner ring 65 and protruding freely through openings 68 in the outer ring 66 for relative turning movement of said rings. The outer ring 66 is pivotally mounted on diametrically disposed pivot pins 69 to side plates 70 secured to the inside faces of the longitudinal members 71 of the chassis frame 29. The pivot pins 69 are arranged in right angular relation with reference to the pivot pins 67 and are anchored in the ring 66 with the outer ends thereof mounted for free turning movement in openings in the side plates 70. The ring 65 is provided with a circular plate 73 secured to the inner periphery thereof through which the cylinders 57 protrude and are affixed thereto in any desired manner.

The piston rods 62 are connected with the frame 20 for swivel turning movement by means of inner and outer rings 76 and 77 which are pivoted together on diametrically disposed pivot pins 78 arranged in alignment with the pivot pins 67 and which are anchored in the inner ring 76 and protrude freely through openings 79 in the outer ring 77 for turning movement of the inner ring with reference to the outer ring. The outer ring 77 is pivoted for turning movement on diametrically disposed pivot pins 80 located in right angular relation to the pivot pins 78 and in alignment with the pivot pins 69. The pivot pins 80 are anchored in the outer ring 77 with the outer ends thereof extending freely through openings in the side plates 82 of a rectangular frame 83 affixed to the channel members 23 and to the channel sections 26 and 27 between the channel members 23. The lower portion of the rectangular frame 83 protrudes below the said frame 20 with the ring 77 pivoted to the protruding portion thereof. The inner ring 76 is provided with a circular plate 84 secured to the inner periphery thereof to which is affixed by screws 85 or equivalent fastening means, a cross bar 76 affixed to and connecting the upper ends of the piston rods 62. The pivot pins 67 and 78 are located on axes extending longitudinally of the truck while the pivot pins 69 and 70 are located on axes extending transversely of the truck whereby the cylinders 57 together with the inner ring 65 have turning movement on a longitudinal axis with reference to the outer ring 66, and the inner and outer rings 65 and 66 have combined swinging movement on a transverse axis through the pivot pins 69. Similarly, the piston rods 62 together with the inner ring 76 have pivotal movement with reference to the outer ring 77 on a longitudinal axis while the inner and outer rings 76 and 77 have combined turning movement on the transverse axis through the pivot pins 80.

The truck body frame 20 also includes channel shaped side members 92 and 93 which are affixed at their ends to the channel members 24 and 25. Rigidly affixed to the frame 20 are upstanding posts 94 of rectangular formation in cross section which are located at the corners of the truck body, forming corner posts. The tail gate 11 is swingably connected to the rear corner posts 94 at the upper ends thereof on pivots 95. The tail gate is retained in closed relation by latch members 96 which engage latch bars 97 affixed to the tail gate adjacent the bottom edge thereof and which project outwardly over the rear faces of the rear corner posts 94. The latch members 96 are of hooked formation and are formed on the outer ends of rods 99 which extend rearwardly through openings in the channel member 25. The rods 99 are pivoted at their forward ends as at 100 to crank arms 101 affixed to the ends of a cross shaft 102 which is journaled for turning movement in bearings 103 affixed to the forward corner posts. The cross shaft 102 on the left hand side of the truck is affixed to a latch release handle 104 which projects forwardly through a slot in the channel member 24 and thence upwardly in front of the truck body. The bottom flange of the frame member 92 is cut away at its forward end as at 105 to permit downward swinging of the latch release handle 104 so as to turn the cross shaft 102 and swing the crank arms 101 downwardly as shown in broken lines in Fig. 9 of the drawings to thereby simultaneously move the rods 99 rearwardly and the latch members 96 away from the latch bars 97 to release the tail gate for dumping.

The side gates 12 and 13 are of lesser height than the tail gate and are swingably connected at their lower edges to the lower ends of the corner posts 94 on pivot pins 108, the side gate 12 being pivotally connected to the two corner posts on the left hand side of the truck, while the side gate 13 is pivotally connected to the two corner posts on the right hand side thereof. The side gates are secured in closed relation by means of latch members 109 which engage latch bars 110 secured to the side gates adjacent the upper edges thereof and which project over the side faces of the corner posts respectively. The latch members 109 are of hooked formation and are formed at the outer ends of lever arms 111. Two such latch members are provided for each side gate which project through slots 112 in the side walls of the corner posts and into engagement with the latch bars 110. The lever arms 111 are pivoted within the corner posts on pivot pins 113 with the inner ends of the arms pivoted to the upper ends of rods 114 on pivot pins 115 and with the lower ends of the rods pivoted to crank arms 116 on pivot pins 117. The two crank arms 116 for the side gate 12 are affixed to a shaft 118 which is mounted for turning movement in bearings 119 mounted on the side frame 92, while the two crank arms for the side gate 13 are affixed to a shaft 120 which is mounted for turning movement in bearings 121 mounted on the side frame 93. The shafts 118 and 120 project through openings in the channel member 24 and are each provided with a handle 122 located forwardly of the truck body and which are adapted to be selectively turned downward for turning the shafts 118 and 120 respectively so as to rock the lever arms 111 to thereby free the latch members from engagement with the latch bars to permit downward swinging movement of either one of the side gates.

Raising and lowering of the truck body is adapted to be controlled by means of a valve 125 mounted on the panel board of the cab and which is of standard construction and has an operating handle 126 adapted to be placed in neutral position when the truck body is in either lowered or elevated position. The valve is connected with the pump 58 by means of conduits 127 and 128 which are connected respectively with the pressure side of the pump and with the oil reservoir of the pump. When the handle 126 is in neutral position, the hydraulic fluid will be circulated from the pump through the valve and back to the reservoir. When the handle of the valve is turned in one direction, the hydraulic fluid will flow through the conduit 59 which branches to the lower ends of the two cylinders 57 to thereby move the pistons 62 upwardly for elevating the truck body. The hydraulic fluid above the piston heads 63 will be discharged through the conduit 60 and thence through the valve and to the pump reservoir. When the handle 126 is moved in the opposite direction, the hydraulic fluid will be forced through the conduit 60 and thence through the branch conduits to the upper ends of the cylinders 57 so as to force the piston rods 62 downwardly to thereby lower the truck body, the downward movement of the piston rods forcing the hydraulic fluid from the lower ends of the cylinders through the conduit 59 and thence through the valve and to the pump reservoir. The pump 58 is adapted to be connected with the motor of the truck in any desired manner for placing the same in and out of operation.

The side gates 12 and 13 swing downwardly on their pivotal connections 108 into substantially co-planar relation with the bed of the truck for dumping through either side thereof and are retained in such co-planar relation by chains (not shown) attached at their ends to the corner posts and to upper ends of the side gates.

The invention has been illustrated and described in its preferred form but it is to be understood that the same is not limited thereto but shall cover and include any and all modifications which fall within the purview of the invention.

What is claimed is:

In a dump truck of the character described, a chassis, a truck body having a tail gate and a side gate at each side thereof for dumping through the rear and through either side of the truck, means pivotally mounting said body with reference to said chassis for swinging the body to angular relation for dumping through the rear and through either side thereof, means for raising and lowering said truck body including a pair of cylinders arranged one on each side of the drive shaft of the truck and having reciprocatory pistons mounted in the ends thereof, inner and outer concentric rings pivotally connected together on a diametric axis, said outer ring being pivotally connected to said chassis on a diametric axis disposed in right angular relation to the aforesaid axis, said cylinders being located within and affixed to said inner ring, inner and outer concentric rings pivotally connected together on a diametric axis, said outer ring being pivotally connected to said truck body on a diametric axis disposed in right angular relation to said last mentioned axis, the upper ends of said pistons being located within and affixed to said last mentioned ring, and conduit means connected with said cylinders at the top and bottom thereof for conveying fluid under pressure into said cylinders for raising and lowering said pistons and truck body.

References Cited in the file of this patent

UNITED STATES PATENTS

| 1,595,981 | Ballert | Aug. 17, 1926 |
| 1,812,915 | Wright | July 7, 1931 |
| 1,831,489 | Flowers | Nov. 10, 1931 |
| 2,029,995 | Flowers | Feb. 4, 1936 |
| 2,180,066 | Porter | Nov. 14, 1939 |

FOREIGN PATENTS

| 547,722 | France | Sept. 30, 1922 |